(12) United States Patent
Yun et al.

(10) Patent No.: US 11,705,277 B2
(45) Date of Patent: Jul. 18, 2023

(54) MULTILAYER CAPACITOR

(71) Applicant: SAMSUNG ELECTRO-MECHANICS CO., LTD., Suwon-si (KR)

(72) Inventors: Hyea Sun Yun, Suwon-si (KR); Sung Ae Kim, Suwon-si (KR); Ji Hun Jeong, Suwon-si (KR); Yoo Jin Choi, Suwon-si (KR); Jong Ho Lee, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 73 days.

(21) Appl. No.: 17/224,586

(22) Filed: Apr. 7, 2021

(65) Prior Publication Data

US 2022/0122769 A1  Apr. 21, 2022

(30) Foreign Application Priority Data

Oct. 16, 2020  (KR) .................. 10-2020-0134219

(51) Int. Cl.
*H01G 4/005* (2006.01)
*H01G 4/248* (2006.01)
*H01G 4/30* (2006.01)

(52) U.S. Cl.
CPC ............. *H01G 4/005* (2013.01); *H01G 4/248* (2013.01); *H01G 4/30* (2013.01)

(58) Field of Classification Search
CPC .......... H01G 4/005; H01G 4/248; H01G 4/30
USPC ............. 361/306.3, 303, 301.4, 321.1, 321.3
See application file for complete search history.

(56) References Cited

U.S. PATENT DOCUMENTS

| | | | | |
|---|---|---|---|---|
| 6,829,134 B2 * | 12/2004 | Yamauchi | ................ | H01G 4/30 361/306.3 |
| 2014/0211368 A1 * | 7/2014 | Fujii | ........................ | H01G 4/12 361/301.4 |
| 2014/0318844 A1 * | 10/2014 | Kim | ......................... | H01G 4/30 361/301.4 |
| 2016/0233027 A1 * | 8/2016 | Iijima | ..................... | H01G 4/232 |
| 2017/0301471 A1 * | 10/2017 | Ono | ........................ | H01G 4/224 |
| 2019/0096584 A1 * | 3/2019 | Hong | ........................ | H01G 4/30 |

FOREIGN PATENT DOCUMENTS

| | | | |
|---|---|---|---|
| JP | 2002-299146 A | | 10/2002 |
| JP | 2016012640 A | * | 1/2016 |
| JP | 2018-133419 A | | 8/2018 |

\* cited by examiner

*Primary Examiner* — Arun Ramaswamy
(74) *Attorney, Agent, or Firm* — Morgan, Lewis & Bockius LLP (57) ABSTRACT

A multilayer capacitor includes a body including dielectric layers and internal electrodes, and external electrodes, wherein the body has first and second surfaces opposing each other in a first direction, third and fourth surfaces opposing each other in a second direction, and fifth and sixth surfaces opposing each other in a third direction perpendicular to the first and second directions. A length of a portion of the plurality of internal electrodes in the third direction in an intermediate region of the body in the first direction is greater than a length of the first surface or the second surface of the body in the third direction. The plurality of internal electrodes have a bottleneck structure between the intermediate region and at least one of the first and second surfaces, and wherein the bottleneck structure has a shape recessed into an inner portion of the body.

26 Claims, 7 Drawing Sheets

MULTILAYER CAPACITOR

CROSS-REFERENCE TO RELATED APPLICATION(S)

The present application claims the benefit of priority to Korean Patent Application No. 10-2020-0134219, filed on Oct. 16, 2020 in the Korean Intellectual Property Office, the disclosure of which is incorporated herein by reference in its entirety.

TECHNICAL FIELD

The present disclosure relates to a multilayer capacitor.

BACKGROUND

A capacitor is a device which may store electricity, and here, when two electrodes are opposed to each other and a voltage is applied thereto, electricity may be accumulated in each electrode. When a DC voltage is applied, a current may flow in the capacitor as electricity is stored, but when the accumulation is completed, the current may not flow. When an AC voltage is applied, polarities of the electrodes may change such that an alternating current may flow.

There may be various types of capacitors, such as an aluminum electrolytic capacitor including, depending a type of an insulating material provided between electrodes, aluminum electrodes and a thin oxide film disposed between the aluminum electrodes, a tantalum capacitor using tantalum as a material of an electrode, a ceramic capacitor using a dielectric material with a high dielectric constant, such as titanium barium, between electrodes, a multilayer ceramic capacitor (MLCC) using a ceramic material with a high dielectric constant in a multilayer structure as a dielectric material provided between electrodes, and a film capacitor using a polystyrene film as a dielectric material provided between electrodes.

Among such capacitors, a multilayer ceramic capacitor may have excellent temperature properties and frequency properties and may have a small size, such that a multilayer ceramic capacitor has been increasingly used in a variety of fields such as a high-frequency circuit. Recently, there have been continuous attempts to implement a small-sized multilayer ceramic capacitor, and to this end, a dielectric layer and an internal electrode have been designed to have a reduced thickness. However, as sizes of components have been decreased, there may be a limitation in increasing the number of laminated internal electrodes, and accordingly, it may be difficult to secure an intended level of capacitance.

SUMMARY

An aspect of the present disclosure is to provide a multilayer capacitor in which an effective area of an internal electrode may be additionally secured such that capacitance may increase.

According to an aspect of the present disclosure, a multilayer capacitor includes a body including a plurality of dielectric layers and a plurality of internal electrodes stacked with a dielectric layer interposed therebetween, and external electrodes disposed externally on the body and connected to the internal electrodes, wherein the body may have a first surface and a second surface exposing the plurality of internal electrodes from the body and opposing each other in a first direction, a third surface and a fourth surface opposing each other in a second direction, which is a stacking direction of the plurality of dielectric layers, and a fifth surface and a sixth surface opposing each other in a third direction perpendicular to the first and second directions. A length of at least a portion of the plurality of internal electrodes in the third direction in an intermediate region of the body in the first direction may be greater than a length of the first surface or the second surface of the body in the third direction. The plurality of internal electrodes may have a bottleneck structure between the intermediate region and at least one of the first and second surfaces, and wherein the bottleneck structure may have a shape recessed into an inner portion of the body in the third direction.

Each of the internal electrodes may have the bottleneck structure located adjacent to the first and second surfaces.

The bottleneck structure may have a curved shape.

The bottleneck structure may have a step structure.

Each of the external electrodes may include an underlying layer and a plating layer covering the underlying layer, and at least a portion of the dielectric layers may have an external surface located on an outer side than the underlying layer in the third direction.

The at least a portion of the internal electrodes may have an external surface located on an outer side than an external surface of the plating layer in the third direction.

The at least a portion of the internal electrodes may have a flat portion having a substantially constant length in the third direction.

The flat portion may be connected to the bottleneck structure and may be disposed in a position including the intermediate region.

A percentage of L2/L1 may be 30-55%, where a length of the body in the first direction is defined as 'L1' and a length of the flat portion in the first direction is defined as 'L2'.

The body may have a shape in which a length of the intermediate region in the third direction is greater than a length of the first and second surfaces in the third direction, and the body may include a first recess portion connecting the first surface to the fifth and sixth surfaces, and a second recess portion connecting the second surface to the fifth and sixth surfaces.

The external electrodes may include a first external electrode covering the first surface and the first recess portion, and a second external electrode covering the second surface and the second recess portion.

At least a portion of the internal electrodes may have a flat portion having a substantially constant length in the third direction, and the flat portion may be disposed between the first and second external electrodes in the first direction.

A region of the first external electrode covering the first recess portion may have an external surface located on an outer side than the fifth surface or the sixth surface in the third direction.

A region of the first external electrode covering the first recess portion may have an external surface substantially coplanar with the fifth surface or the sixth surface.

A region of the first external electrode covering the first recess portion may have an external surface located on an inner side than the fifth surface or the sixth surface in the third direction.

At least a portion of the internal electrodes may have an overlapping region with the first external electrode disposed on the first recess portion in the first direction, and a percentage of W2/W1 may be 5-10%, where a length of the body in the third direction is defined as 'W1', and a length of the overlapping region of the at least a portion of the internal electrodes in the third direction is defined as 'W2'.

The at least a portion of the internal electrodes may have an additional bottleneck structure disposed in a region connected to the external electrode.

According to another aspect of the present disclosure, a multilayer capacitor includes a body including a plurality of dielectric layers and a plurality of internal electrodes stacked with a dielectric layer interposed therebetween, and external electrodes disposed externally on the body, connected to the internal electrodes, and each including an underlying layer and a plating layer covering the underlying layer, wherein the body may have a first surface and a second surface exposing the plurality of internal electrodes from the body and opposing each other in a first direction, a third surface and a fourth surface opposing each other in a second direction, which is a stacking direction of the plurality of dielectric layers, and a fifth surface and a sixth surface opposing each other in a third direction perpendicular to the first and second directions. The at least a portion of the internal electrodes may have an external surface located on an outer side than the underlying layer in the third direction.

The at least a portion of the internal electrodes may have an external surface disposed on an outer side than the plating layer in the third direction.

According to still another aspect of the present disclosure, a multilayer capacitor includes a body including a plurality of dielectric layers and a plurality of internal electrodes stacked with a dielectric layer interposed therebetween in a stacking direction; and first and second external electrodes disposed on first and second surfaces of the body, respectively, and connected to the internal electrodes, the first and second surfaces of the body opposing each other in a length direction. Each of the first and second external electrodes includes a connection portion connected to the internal electrodes, and a bending portion overlapping a portion of the internal electrodes in a width direction perpendicular to the length direction and the stacking direction. The internal electrodes include an increased-width portion overlapping the bending portions of the first and second external electrodes in the length direction, and the increased-width portion has a substantially flat surface.

BRIEF DESCRIPTION OF DRAWINGS

The above and other aspects, features, and advantages of the present disclosure will be more clearly understood from the following detailed description, taken in conjunction with the accompanying drawings, in which.

DETAILED DESCRIPTION

Hereinafter, embodiments of the present disclosure will be described as follows with reference to the attached drawings.

The present disclosure may, however, be exemplified in many different forms and should not be construed as being limited to the specific embodiments set forth herein. Rather, these embodiments are provided so that this disclosure will be thorough and complete, and will fully convey the scope of the disclosure to those skilled in the art. Accordingly, shapes and sizes of the elements in the drawings may be exaggerated for clear description. Also, elements having the same function within the scope of the same concept represented in the drawing of each example embodiment will be described using the same reference numeral.

In the drawings, same elements will be indicated by same reference numerals. Also, redundant descriptions and detailed descriptions of known functions and elements that may unnecessarily make the gist of the present invention obscure will be omitted. In the accompanying drawings, some elements may be exaggerated, omitted or briefly illustrated, and the sizes of the elements do not necessarily reflect the actual sizes of these elements. Also, it will be understood that when a portion "includes" an element, it may further include another element, not excluding another element, unless otherwise indicated.

Figure 1:
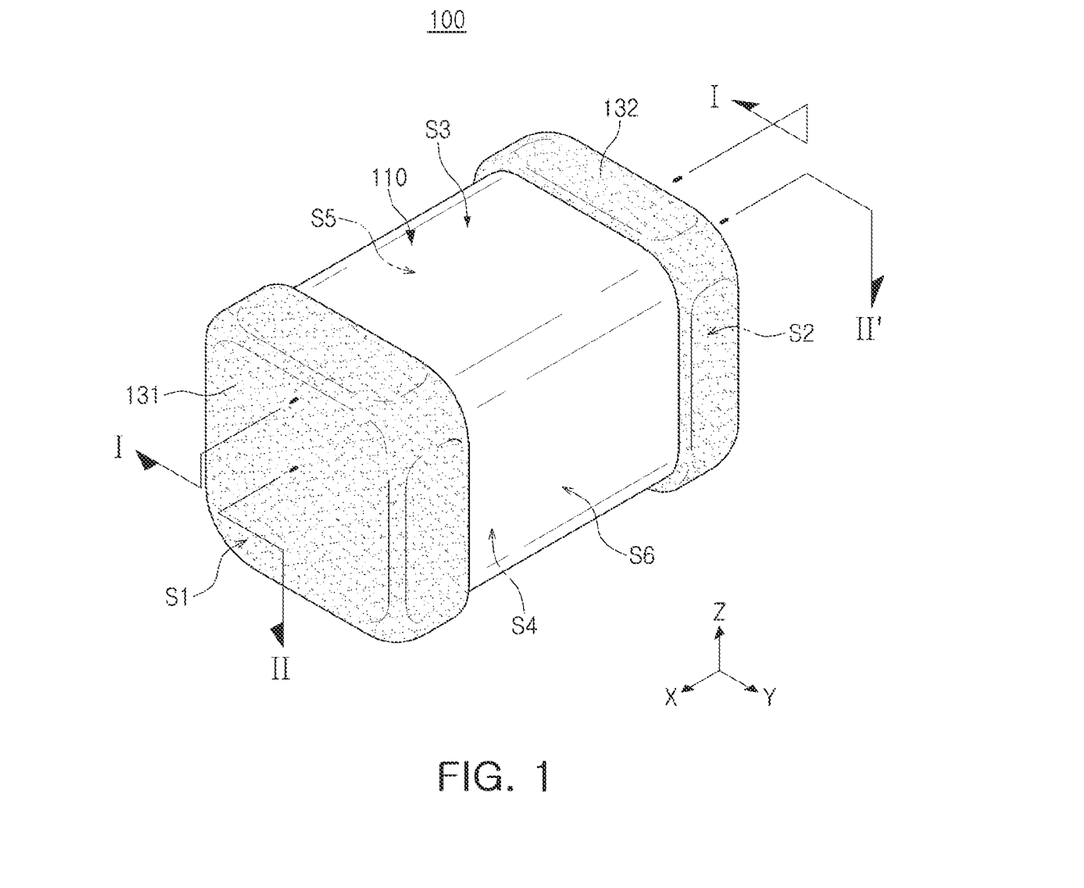
FIG. 1 is a perspective diagram illustrating an exterior of a multilayer capacitor according to an example embodiment of the present disclosure.
Figure 2:
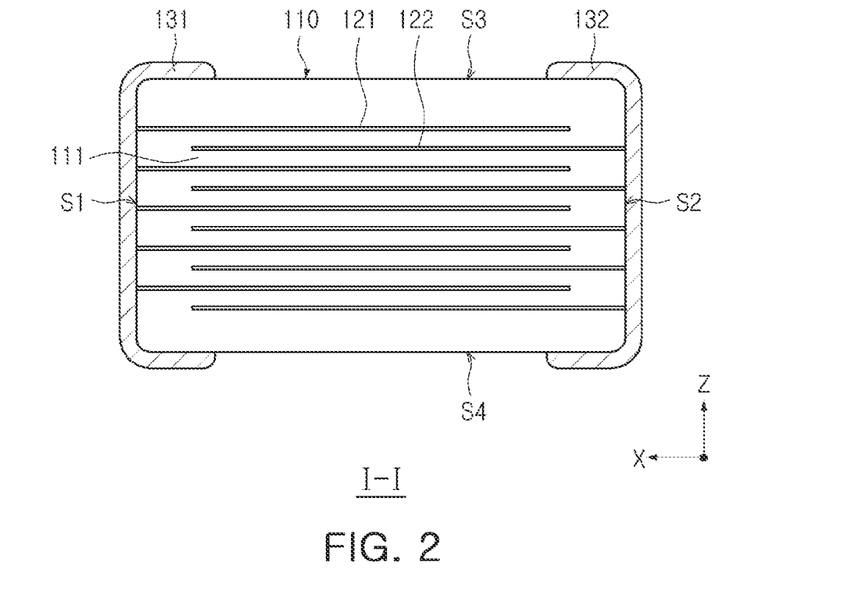
FIG. 2 is a cross-sectional diagram illustrating the multilayer capacitor illustrated in FIG. 1 taken along line I-I' in FIG. 1.
Figure 3:
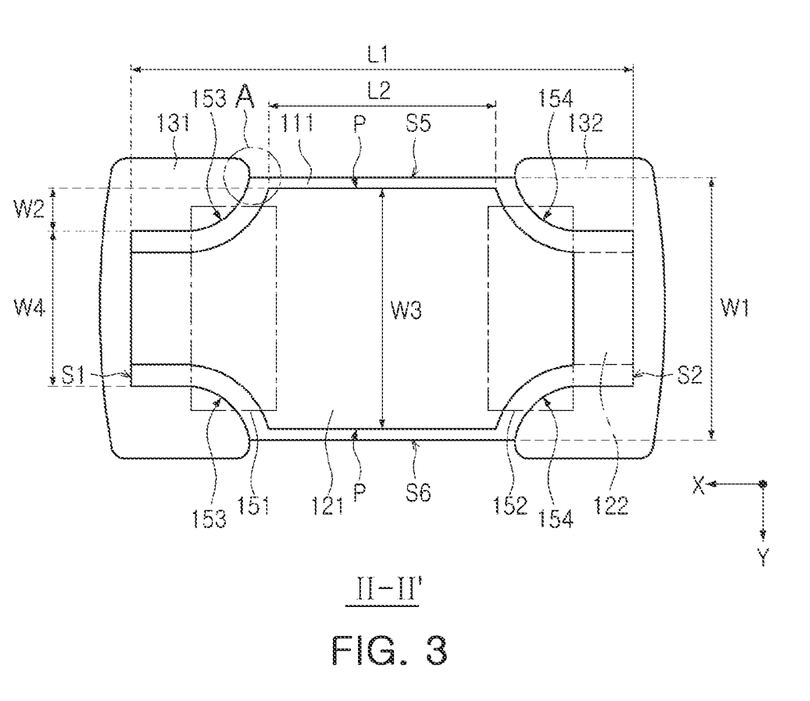
FIG. 3 is a cross-sectional diagram illustrating the multilayer capacitor illustrated in FIG. 1 taken along line II-II' in FIG. 1.
Figure 4A:
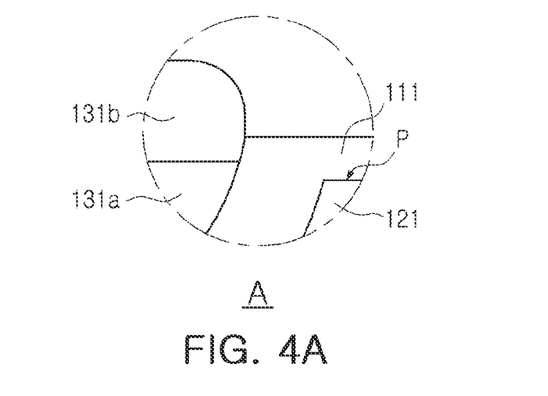
FIGS. 4A and 4B are enlarged diagrams illustrating portion A illustrated in FIG. 3.
Figure 4B:
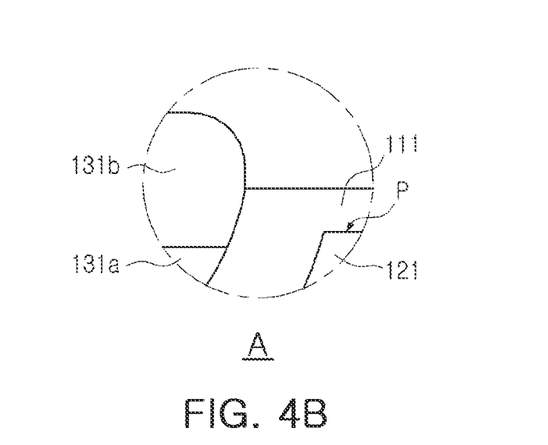

FIG. 1 is a perspective diagram illustrating an exterior of a multilayer capacitor according to an example embodiment. FIG. 2 is a cross-sectional diagram illustrating the multilayer capacitor illustrated in FIG. 1 taken along line I-I' in FIG. 1. FIG. 3 is a cross-sectional diagram illustrating the multilayer capacitor illustrated in FIG. 1 taken along line II-II' in FIG. 1. FIGS. 4A and 4B are enlarged diagrams illustrating portion A illustrated in FIG. 3. FIGS. 5 to 8 are diagrams illustrating the multilayer capacitor illustrated in FIG. 1 taken along line II-II' in FIG. 1, illustrating modified examples.

Referring to FIGS. 1 to 4, a multilayer capacitor 100 in an example embodiment may include a body 110 including a dielectric layer 111 and a plurality of internal electrodes 121 and 122 stacked with the dielectric layer 111 therebetween, and external electrodes 131 and 132, and at least a portion of the plurality of internal electrodes 121 and 122 may have bottleneck structures 151 and 152. The bottleneck structures 151 and 152 may have a shape recessed into an inner portion of the body 110 in one direction (Y direction in FIG. 3).

The body 110 may include a laminate structure in which a plurality of dielectric layers 111 are stacked, and may be obtained by stacking a plurality of green sheets and sintering the sheets, for example. By the sintering process, the plurality of dielectric layers 111 may have an integrated form. The shape and dimensions of the body 110 and the number of stacked dielectric layers 111 are not limited to the examples illustrated in the example embodiment. For example, as illustrated in FIG. 1, the body 110 may have a shape similar to a rectangular parallelepiped. The body 110 may include a first surface S1 and a second surface S2 exposing the internal electrodes 121 and 122, respectively, and opposing each other in a first direction (X direction or length direction), a third surface S3 and a fourth surface S4 opposing each other in a second direction (Z direction), which is a stacking direction of the plurality of dielectric layers 111, and a fifth surface S5 and a sixth surface S6 opposing each other in a third direction (Y direction or width direction) perpendicular to the first and second directions.

The dielectric layer 111 included in the body 110 may include a ceramic material having a high dielectric constant, such as BT-based ceramic, a barium titanate ($BaTiO_3$)-based ceramic, and other generally used materials may be used as long as sufficient capacitance is able to be obtained therewith. The dielectric layer 111 may further include additives, organic solvents, plasticizers, binders, and dispersants, if desired, along with a ceramic material, a main component. The additive may include a metal component, and the additives may be added in the form of a metal oxide during a manufacturing process. As an example of the metal oxide additive, at least one of $MnO_2$, $Dy_2O_3$, BaO, MgO, $Al_2O_3$, $SiO_2$, $Cr_2O_3$ and $CaCO_3$ may be included.

The plurality of internal electrodes 121 and 122 may be obtained by printing a paste containing a conductive metal to a predetermined thickness on one surface of the ceramic green sheet and sintering the paste. In this case, the plurality of internal electrodes 121 and 122 may include the internal electrodes 121 and 122 exposed to the first and second surfaces S1 and S2 of the body 110 opposing each other, as illustrated in FIG. 2. In this case, the first and second internal electrodes 121 and 122 may be connected to different external electrodes 131 and 132 and may have different polarities when driven, and the first and second internal electrodes 121 and 122 may be electrically separated from each other by the dielectric layer 111 disposed therebetween. The number of external electrodes 131 and 132 or a connection method with the internal electrodes 121 and 122 may be varied in example embodiments. A main material of the internal electrodes 121 and 122 may be nickel (Ni), copper (Cu), palladium (Pd), silver (Ag), and the like, and alloys thereof may also be used.

The external electrodes 131 and 132 may be formed externally on the body 110 and may include first and second external electrodes 131 and 132 connected to the first and second internal electrodes 121 and 122, respectively. In this case, as illustrated in FIGS. 4A and 4B, the external electrodes 131 and 132 may have a multilayer structure, and may include an underlying layer 131a and a plating layer 131b covering the underlying layer 131a. The base layer 131a may be formed by preparing a material including a conductive metal as a paste and applying the paste to the body 110. An example of the conductive metal may include nickel (Ni), copper (Cu), Palladium (Pd), gold (Au), or alloys thereof. The plating layer 131b may include Ni, Sn, or the like, and may be implemented in a multilayer structure.

Referring to FIG. 3, in the example embodiment, at least a portion of the plurality of internal electrodes 121 and 122 may be extended in one direction, and accordingly, an area in which the plurality of internal electrodes 121 and 122 overlap may increase such that capacitance may improve. Specifically, the first internal electrode 121 may have a length W3 in the third direction (Y direction) in an intermediate region of the body 110 in the first direction (X direction) greater than a length W4 of the first surface S1 or the second surface S2 of the body 110 in the third direction (Y direction), and may have bottleneck structures 151 and 152 formed between the intermediate region and at least one of the first surface S1 and the second surface S2. In the example embodiment, the bottleneck structures 151 and 152 may be formed on both the first and second surfaces S1 and S2 in the internal electrode 121, or the bottleneck structures 151 and 152 may be formed only on one of the surfaces.

The bottleneck structures 151 and 152 may have a shape recessed into an inner portion of the body 110 in the third direction (Y direction), and the configuration indicates that a region of the first internal electrode 121 forming the bottleneck structures 151 and 152 is not convex to an external side of the body 110. The bottleneck structures 151 and 152 recessed into the inner portion of the body 110 may be advantageous to reducing a size of the multilayer capacitor 100, and since the first internal electrode 121 may have an expanded region as compared to an internal electrode in a general multilayer capacitor 100, capacitance of the multilayer capacitor 100 may improve. Also, the bottleneck structures 151 and 152 may contribute to securing reliability against external influences such as penetration of a plating solution when the external electrodes 131 and 132 are formed.

To increase capacitance, the first internal electrode 121 may need to be sufficiently extended in the third direction (Y direction), and thus, as illustrated in FIG. 4A, an external surface of the first internal electrode 121 may extend to reach the underlying layer 131a of the external electrodes 131 and 132 in the third direction (Y direction). Further, as illustrated in FIG. 4B, an external surface of the first internal electrode 121 may be disposed on an outer side than the underlying layer 131a of the external electrodes 131 and 132 in the third direction (Y direction) and may extend to reach the plating layer 131b. When the first internal electrode 121 extends to an outer side than the underlying layer 131a, the first internal electrode 121 does not necessarily include the bottleneck structures 151 and 152, and the first internal electrode 121 including the extended structure without the bottleneck structures 151 and 152 may also be included in example embodiments. The bottleneck structures 151 and 152 may also be formed on the second internal electrode 122, and the following description may also be applied to the second internal electrode 122.

Figure 5:
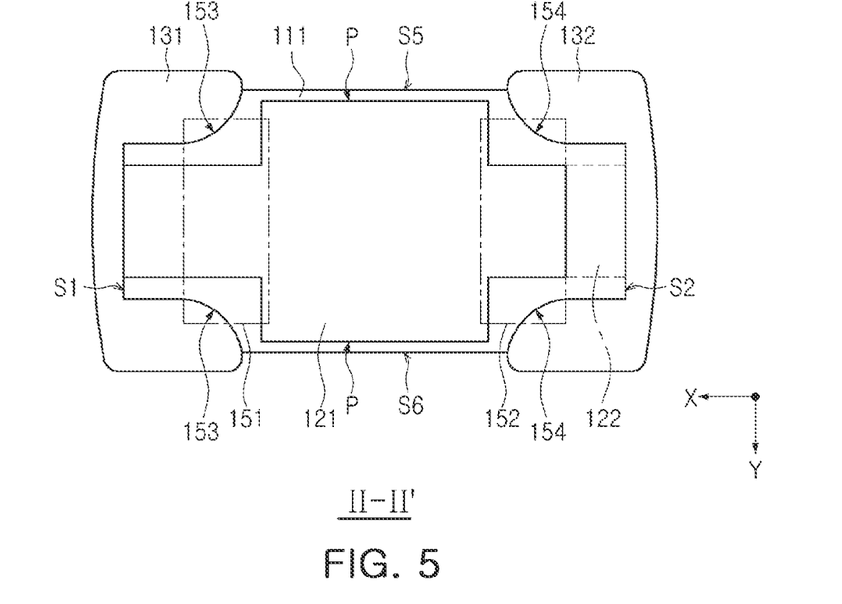
FIGS. 5 to 8 are diagrams illustrating the multilayer capacitor illustrated in FIG. 1 taken along line II-II' in FIG. 1, illustrating modified examples.

As illustrated in FIG. 3, the bottleneck structures 151 and 152 may have a curved shape, thereby sufficiently securing an overlapping region of the internal electrodes 121 and 122. The shape of the bottleneck structures 151 and 152 may be varied in example embodiments. For example, as illustrated in FIG. 5, the bottleneck structures 151 and 152 may have a step structure. In the case of the step structure, a portion of the internal electrodes 121 and 122 may be recessed into an inner portion of the body 110 in the third direction (Y direction).

Referring back to FIG. 3, the first internal electrode 121 having the bottleneck structures 151 and 152 may have a flat portion P having a substantially constant length W3 in the third direction (Y direction). In this case, the flat portion P may be connected to the bottleneck structures 151 and 152 and may be disposed in a position including the intermediate region of the body 110. One or ordinary skill in the art would understand that the expression "substantially constant" refers to being the same or constant by allowing process errors, positional deviations, and/or measurement errors that may occur in a manufacturing process.

The body 110 may include a first recess portion 153 and a second recess portion 154, and specifically, in the body 110, a length W1 of the intermediate region in the third direction (Y direction) may be greater than a length W3 of the first and second surfaces S1 and S3 in the third direction (Y direction). The first recess portion 153 may connect the first surface S1 to the fifth surface S5 and the sixth surface S6, and the second recess portion 154 may connect the second surface S2 to the fifth surface S5 and the sixth surface S6. By including the body 110 having the recessed structure, the multilayer capacitor 100 may have a reduced size. The recessed structure of the body 110 may be formed in the sintering process by the internal electrodes 121 and 122 having the bottleneck structures 151 and 152, or the recessed structure of the body 110 may be formed separately regardless of the shape of the internal electrodes 121 and 122.

When a length of the body 110 in the first direction (X direction) is defined as L1, and a length of the flat portion P in the first direction (X direction) is defined as L2, a percentage of L2/L1 may be 30-55%. Also, the first internal electrode 121 including the bottleneck structures 151 and 152 may have an overlapping region with the first external electrode 131 disposed on the first recess portion 153 in the first direction (X direction). In this case, when a length of the body 110 in the third direction (Y direction) is defined as W1, and a length of the overlapping region of the first internal electrode 121 in the third direction (Y direction) is defined as W2, a percentage ratio of W2/W1 may be 5-10%. These length conditions may be derived to sufficiently secure the overlapping region of the first and second internal electrodes 121 and 122 and to reduce the possibility of being connected to the external electrodes 131 and 132.

As illustrated in the diagram, the first external electrode 131 may cover the first surface S1 and the first recess portion 153, and the second external electrode 132 may cover the second surface S2 and the second recess portion 154. In this case, the flat portion P may be disposed between the first and second external electrodes 131 and 132 in the first direction (X direction). The region of the first external electrode 131 covering the first recess portion 153 may have an external surface disposed on an outer side than the fifth surface S5 or the sixth surface S6 in the third direction (Y direction).

According to one exemplary embodiment of the present disclosure, each of the first and second external electrodes 131 and 132 may include a connection portion connected to the first and second internal electrodes 121 and 122, and a bending portion overlapping a portion of the first and second internal electrodes 121 and 122 in the third direction (Y direction). Here, each of the first and second internal electrodes 121 and 122 may include an increased-width portion overlapping the bending portions of the first and second external electrodes 131 and 132 in the first direction (X direction). The increased-width portion may have a larger width in the third direction (Y direction) than a width of an end portion of the internal electrodes 121 and 122. Further, the increased-width portion has a substantially flat surface. One or ordinary skill in the art would understand that the expression "substantially flat" refers to being flat by allowing process errors, positional deviations, and/or measurement errors that may occur in a manufacturing process.

Figure 6:
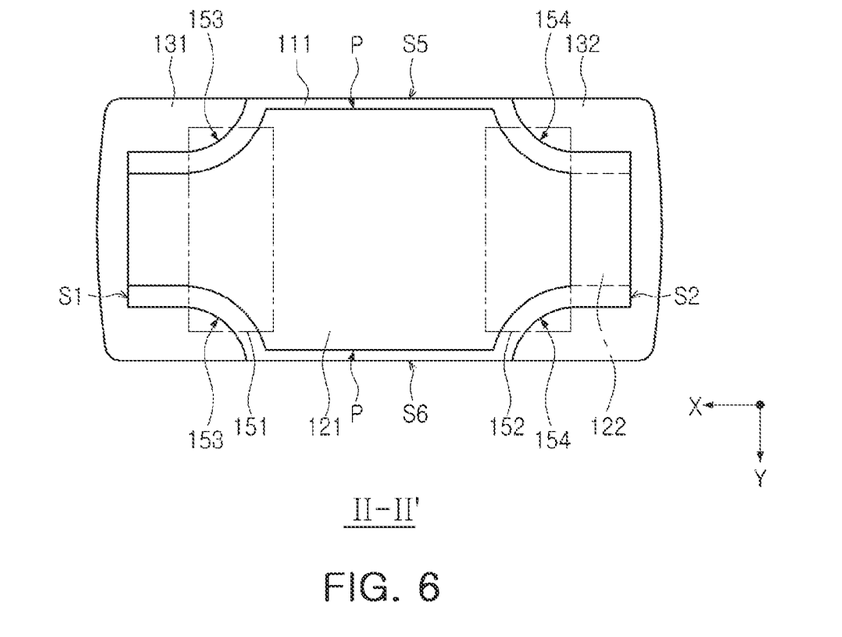

The shape of the external electrodes 131 and 132 may be varied. As illustrated in FIG. 6, the region of the first external electrode 131 covering the first recess portion 153 may have an external surface substantially coplanar with the fifth surface S5 or the sixth surface S6. Similarly, the region of the second external electrode 132 covering the second recess portion 154 may have an external surface substantially coplanar with the fifth surface S5 or the sixth surface S6. One or ordinary skill in the art would understand that the expression "substantially coplanar" refers to lying on the same plane by allowing process errors, positional deviations, and/or measurement errors that may occur in a manufacturing process.

Figure 7:
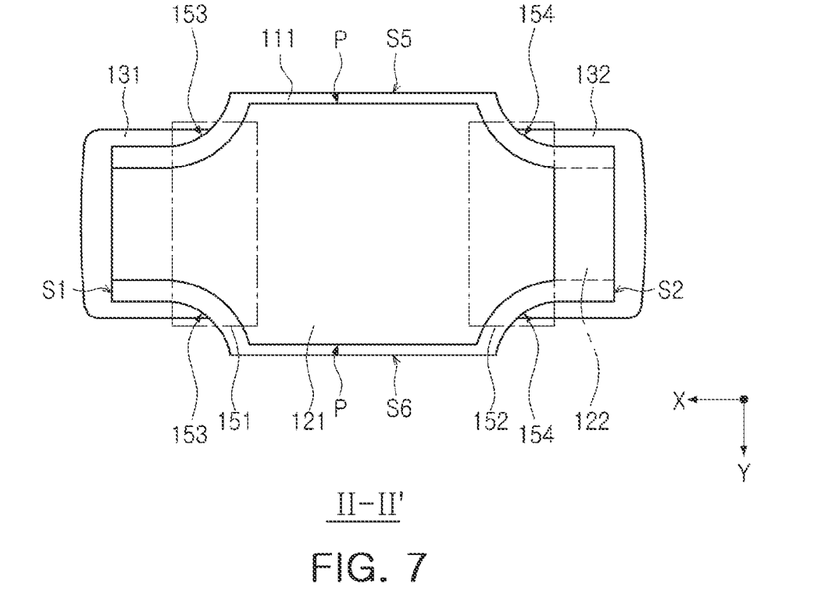

Also, as illustrated in FIG. 7, the sizes of the external electrodes 131 and 132 may be reduced. The region of the first external electrode 131 covering the first recess portion 153 may have an external surface disposed on an inner side than the fifth surface S5 or the sixth surface S6 in the third direction (Y direction), and the inner side may refer to an inner side of the body. Similarly, the region of the second external electrode 132 covering the second recess portion 154 may have an external surface disposed on an inner side than the fifth surface S5 or the sixth surface S6 in the third direction (Y direction). In this case, the external surface of the first internal electrode 121 may be disposed on an outer side than an outermost layer (e.g., a plating layer) of the first external electrode 131 in the third direction (Y direction).

Figure 8:
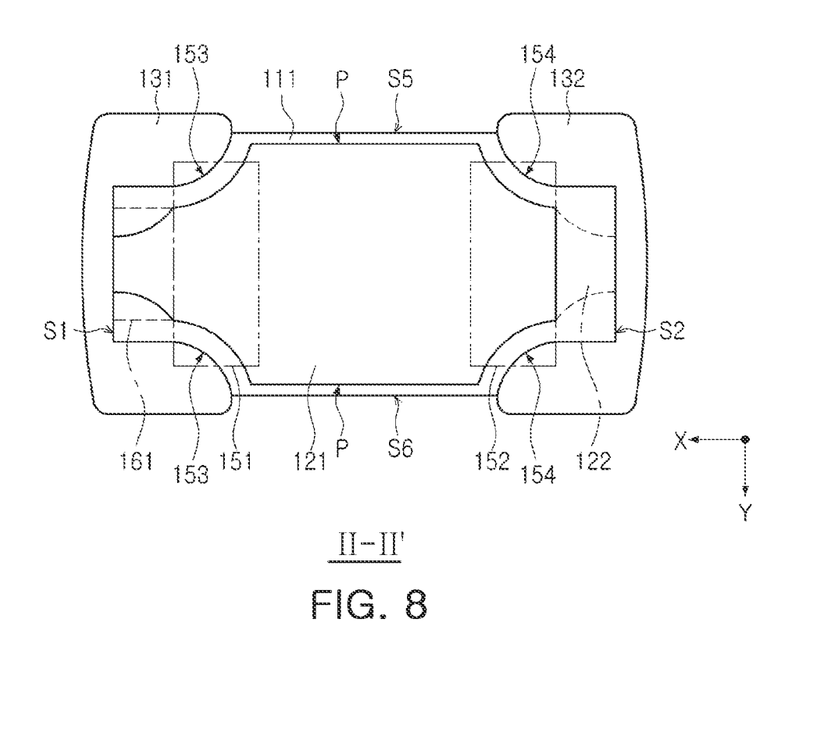

As in the modified example illustrated in FIG. 8, the first internal electrode 121 having the bottleneck structures 151 and 152 may include an additional bottleneck structure 161 formed in a region connected to the first external electrode 131. In this case, the additional bottleneck structure 161 may have a shape recessed into an inner portion of the body 110 in the third direction (Y direction). The additional bottleneck structure 161 may also be applied to the second internal electrode 122. The additional bottleneck structure 161 may contribute to securing reliability against external influences such as penetration of a plating solution when the external electrodes 131 and 132 are formed.

Figure 9:
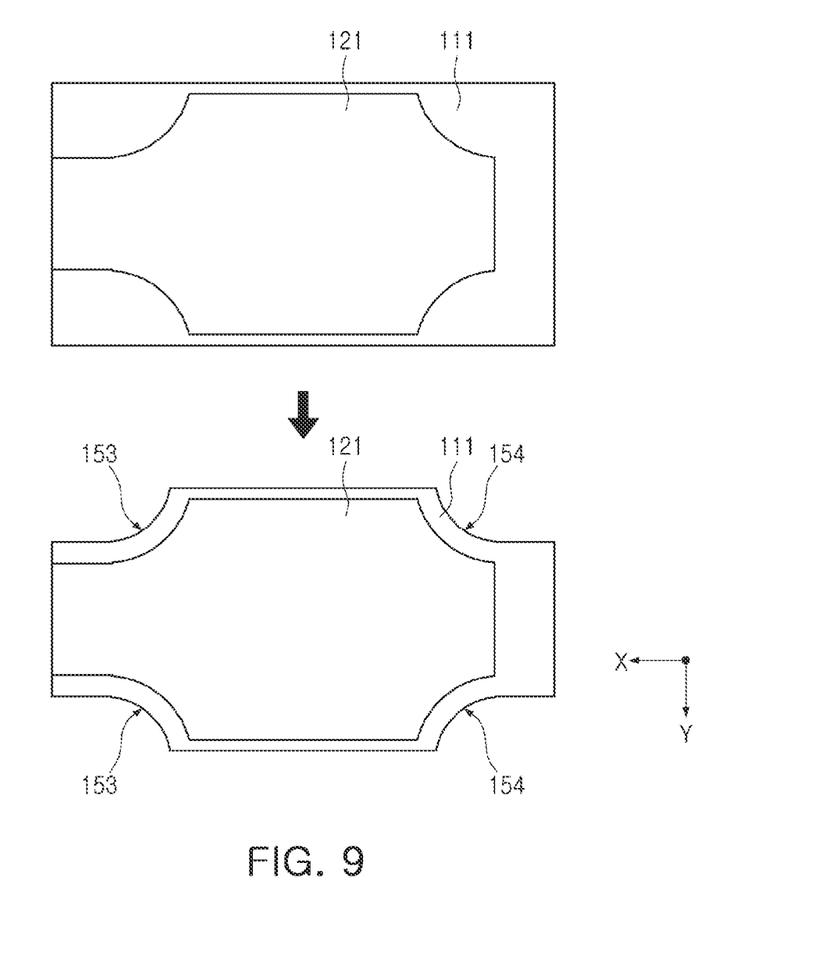
FIGS. 9 and 10 are diagrams illustrating a portion of processes for manufacturing a multilayer capacitor according to an example embodiment of the present disclosure.
Figure 10:
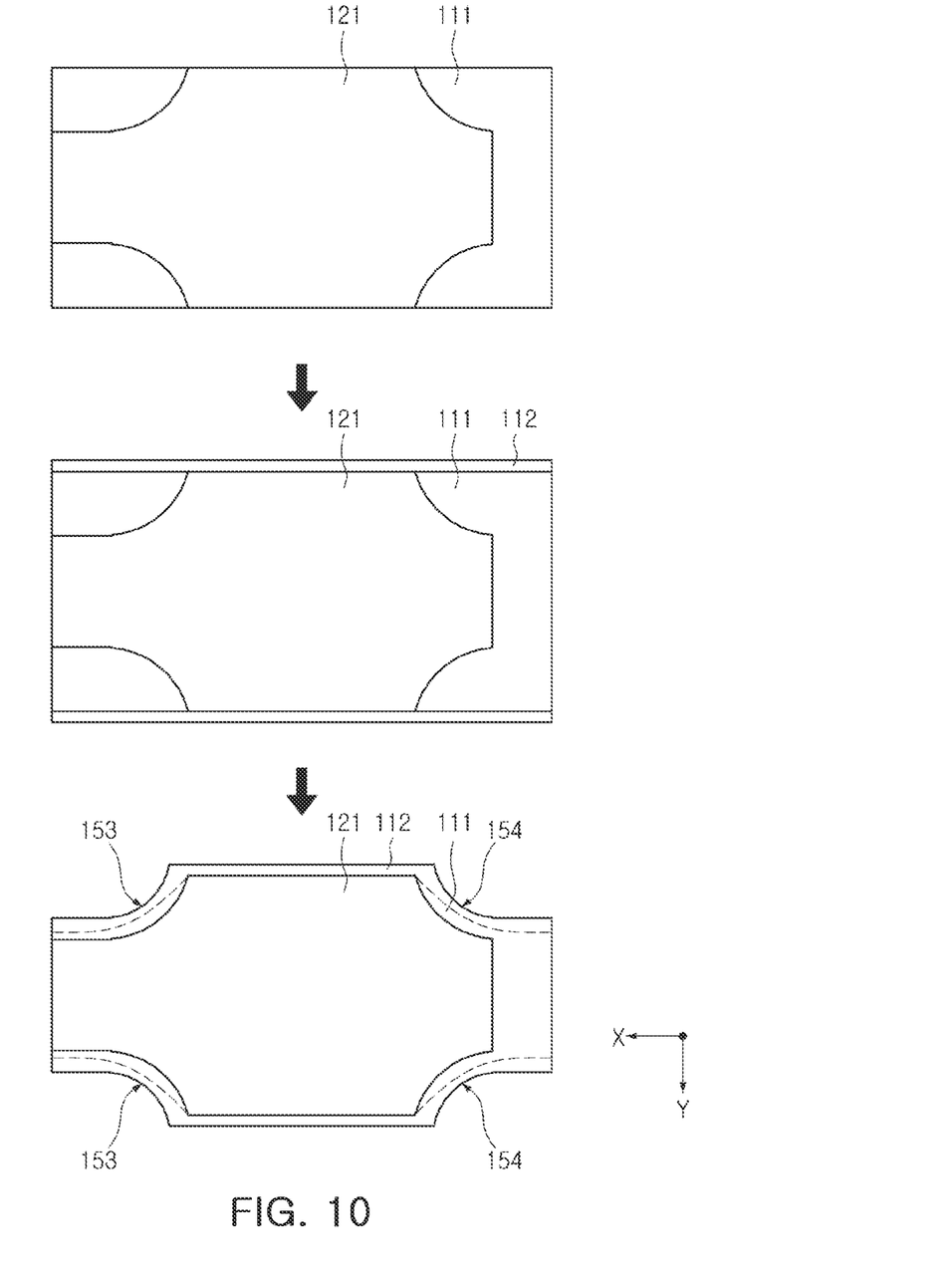

FIGS. 9 and 10 are diagrams illustrating a portion of processes for manufacturing a multilayer capacitor according to an example embodiment.

To form the body 110, a ceramic laminate may be prepared by stacking the dielectric layer 111 and the internal electrodes 121 and 122, and the dielectric layer 111 may be in a ceramic green state before the dielectric layer 111 is sintered. The ceramic green sheet may be prepared by forming a slurry by mixing ceramic powder, a binder, a solvent, and the like, and making the slurry as a sheet having a thickness of several μm by a doctor blade method. The ceramic green sheet may be sintered to form the dielectric layer 111.

The internal electrode 121 may be formed in the pattern form by applying a conductive paste for an internal electrode on the ceramic green sheet. In this case, the internal electrode 121 may be formed by a screen printing method or a gravure printing method. The conductive paste for an internal electrode may include a conductive metal and an additive, and the additive may include one or both of a non-metal oxide and a metal oxide. The conductive metal may include nickel. The additive may include barium titanate or strontium titanate as a metal oxide. In the example embodiment, the internal electrode 121 may be configured to have a bottleneck structure.

Thereafter, the ceramic green sheet laminate may be sintered, and after the sintering, recess portions 153 and 154 may be formed in the body 110 due to the bottleneck structure of the internal electrode 121. Thereafter, an external electrode may be formed to be connected to the internal electrode 121, thereby manufacturing the multilayer capacitor.

In the example process in FIG. 10, a side surface of the internal electrode 121 may be exposed. The configuration may be obtained by performing a cutting process by a device unit while the internal electrode patterns are connected, not separated. Accordingly, an area of the internal electrode 121 may be increased. A side margin portion 112 may be formed to cover the exposed side surface of the internal electrode 121, and the side margin portion 112 may be formed of a ceramic material the same as that of the dielectric layer 111. Alternatively, the side margin portion 112 may be formed of a material different from that of the dielectric layer 111. Also, the side margin portion 112 may be formed using ceramic particles having a particle size distribution different from that of the dielectric layer 111, and for example, particles having a D50 smaller than that of the dielectric layer 111 may be used. When the dielectric layer 111 and the side margin portion 112 are formed of different materials or particles having different particle size distributions, an interfacial surface (a dotted line in the last diagram in FIG. 10) may be formed between the dielectric layer 111 and the side margin portion 112 after the sintering.

According to the aforementioned example embodiments, the multilayer capacitor may have increased capacitance as compared to a general multilayer capacitor having the same size.

While the example embodiments have been illustrated and described above, it will be apparent to those skilled in the art that modifications and variations could be made without departing from the scope of the present invention as defined by the appended claims.

What is claimed is:

1. A multilayer capacitor, comprising:
a body including a plurality of dielectric layers and a plurality of internal electrodes stacked with a dielectric layer interposed therebetween; and
external electrodes disposed externally on the body and connected to the internal electrodes;
wherein the body has a first surface and a second surface exposing the plurality of internal electrodes from the body and opposing each other in a first direction, a third surface and a fourth surface opposing each other in a second direction, which is a stacking direction of the plurality of dielectric layers, and a fifth surface and a sixth surface opposing each other in a third direction perpendicular to the first and second directions,
wherein a length of at least a portion of the plurality of internal electrodes in the third direction in an intermediate region of the body in the first direction is greater than a length of the first surface or the second surface of the body in the third direction,
wherein the plurality of internal electrodes have a bottleneck structure between the intermediate region and at least one of the first and second surfaces,
wherein the bottleneck structure has a recessed portion recessed into an inner portion of the body in the third direction, and
wherein the internal electrodes are connected to the external electrodes at the first and second surfaces of the body, respectively.

2. The multilayer capacitor of claim 1, wherein the recessed portion of the bottleneck structure is covered by a portion of the body.

3. The multilayer capacitor of claim 2, wherein each of the plurality of internal electrodes has the bottleneck structure located adjacent to the first and second surfaces.

4. The multilayer capacitor of claim 2, wherein the bottleneck structure has a curved shape.

5. The multilayer capacitor of claim 2, wherein the bottleneck structure has a step structure.

6. The multilayer capacitor of claim 1,
wherein each of the external electrodes include an underlying layer and a plating layer covering the underlying layer, and
wherein at least a portion of the dielectric layers have an external surface located on an outer side than the underlying layer in the third direction.

7. The multilayer capacitor of claim 6, wherein the at least a portion of the internal electrodes has an external surface located on an inner side than the underlying layer in the third direction.

8. The multilayer capacitor of claim 6, wherein the at least a portion of the internal electrodes has an external surface located on an outer side than the underlying layer in the third direction.

9. The multilayer capacitor of claim 6, wherein the at least a portion of the internal electrodes have an external surface located on an outer side than an external surface of the plating layer in the third direction.

10. The multilayer capacitor of claim 2, wherein the at least a portion of the internal electrodes have a flat portion having a substantially constant length in the third direction.

11. The multilayer capacitor of claim 10, wherein the flat portion is connected to the bottleneck structure and is disposed in a position including the intermediate region.

12. The multilayer capacitor of claim 10, wherein a percentage ratio of L2/L1 is 30-55%, where a length of the body in the first direction is defined as 'L1' and a length of the flat portion in the first direction is defined as 'L2'.

13. The multilayer capacitor of claim 1,
wherein the body has a shape in which a length of the intermediate region in the third direction is greater than a length of the first and second surfaces in the third direction, and
wherein the body includes a first recess portion connecting the first surface to the fifth and sixth surfaces, and a second recess portion connecting the second surface to the fifth and sixth surfaces.

14. The multilayer capacitor of claim 13, wherein the external electrodes include a first external electrode covering the first surface and the first recess portion, and a second external electrode covering the second surface and the second recess portion.

15. The multilayer capacitor of claim 14,
wherein at least a portion of the internal electrodes have a flat portion having a substantially constant length in the third direction, and
wherein the flat portion is disposed between the first and second external electrodes in the first direction.

16. The multilayer capacitor of claim 14, wherein a region of the first external electrode covering the first recess portion has an external surface located on an outer side than the fifth surface or the sixth surface in the third direction.

17. The multilayer capacitor of claim 14, wherein a region of the first external electrode covering the first recess portion has an external surface substantially coplanar with the fifth surface or the sixth surface.

18. The multilayer capacitor of claim 14, wherein a region of the first external electrode covering the first recess portion has an external surface located on an inner side than the fifth surface or the sixth surface in the third direction.

19. The multilayer capacitor of claim 14,
wherein at least a portion of the internal electrodes have an overlapping region with the first external electrode disposed on the first recess portion in the first direction, and
wherein a percentage ratio of W2/W1 is 5-10%, where a length of the body in the third direction is defined as 'W1', and a length of the overlapping region of the at least a portion of the internal electrodes in the third direction is defined as 'W2'.

20. The multilayer capacitor of claim 2, wherein the at least a portion of the internal electrodes have an additional bottleneck structure disposed in a region connected to the external electrodes.

21. A multilayer capacitor, comprising:
a body including a plurality of dielectric layers and a plurality of internal electrodes stacked with a dielectric layer interposed therebetween; and
external electrodes disposed externally on the body, connected to the internal electrodes, and each including an underlying layer and a plating layer covering the underlying layer,
wherein the body has a first surface and a second surface exposing the plurality of internal electrodes from the body and opposing each other in a first direction, a third surface and a fourth surface opposing each other in a second direction, which is a stacking direction of the plurality of dielectric layers, and a fifth surface and a sixth surface opposing each other in a third direction perpendicular to the first and second directions, and wherein at least a portion of the internal electrodes have an external surface located on an outer side than the underlying layer in the third direction.

22. The multilayer capacitor of claim 21, wherein the at least a portion of the internal electrodes have an external surface located on an outer side than the plating layer in the third direction.

23. A multilayer capacitor, comprising:
a body including a plurality of dielectric layers and a plurality of internal electrodes stacked with a dielectric layer interposed therebetween in a stacking direction; and first and second external electrodes disposed on first and second surfaces of the body, respectively, and connected to the internal electrodes, the first and second surfaces of the body opposing each other in a length direction, wherein each of the first and second external electrodes includes a connection portion connected to the internal electrodes, and a bending portion overlapping a portion of the internal electrodes in a width direction perpendicular to the length direction and the stacking direction, wherein the internal electrodes include an increased-width portion overlapping the bending portions of the first and second external electrodes in the length direction, and wherein the increased-width portion is spaced apart from the bending portion of each of the first and second external electrodes by a portion of the body.

24. The multilayer capacitor of claim 23,
wherein each of the first and second external electrodes includes an underlying layer and a plating layer covering the underlying layer, and
wherein an external surface of the increased-width portion is located on an outer side than the underlying layer in the width direction.

25. The multilayer capacitor of claim 23,
wherein an external surface of the increased-width portion is located on an outer side than the plating layer in the width direction.

26. The multilayer capacitor of claim 23,
wherein the increased-width portion of the internal electrodes has a substantially flat surface,
wherein the dielectric layers include an increased-width portion overlapping the bending portions of the first and second external electrodes in the length direction, and
wherein the increased-width portion of the dielectric layers has a substantially flat surface.

* * * * *